Patented Oct. 26, 1926.

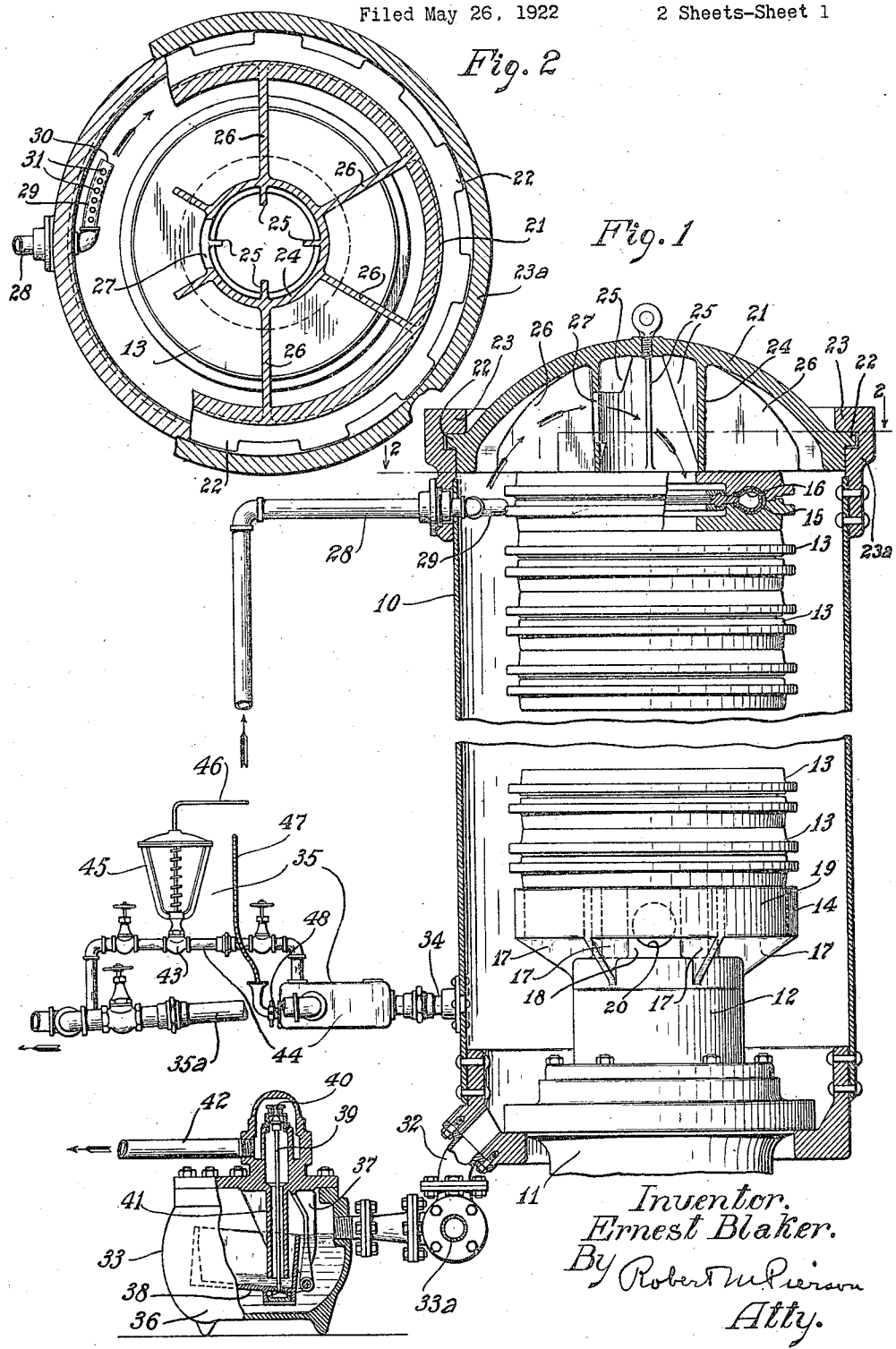

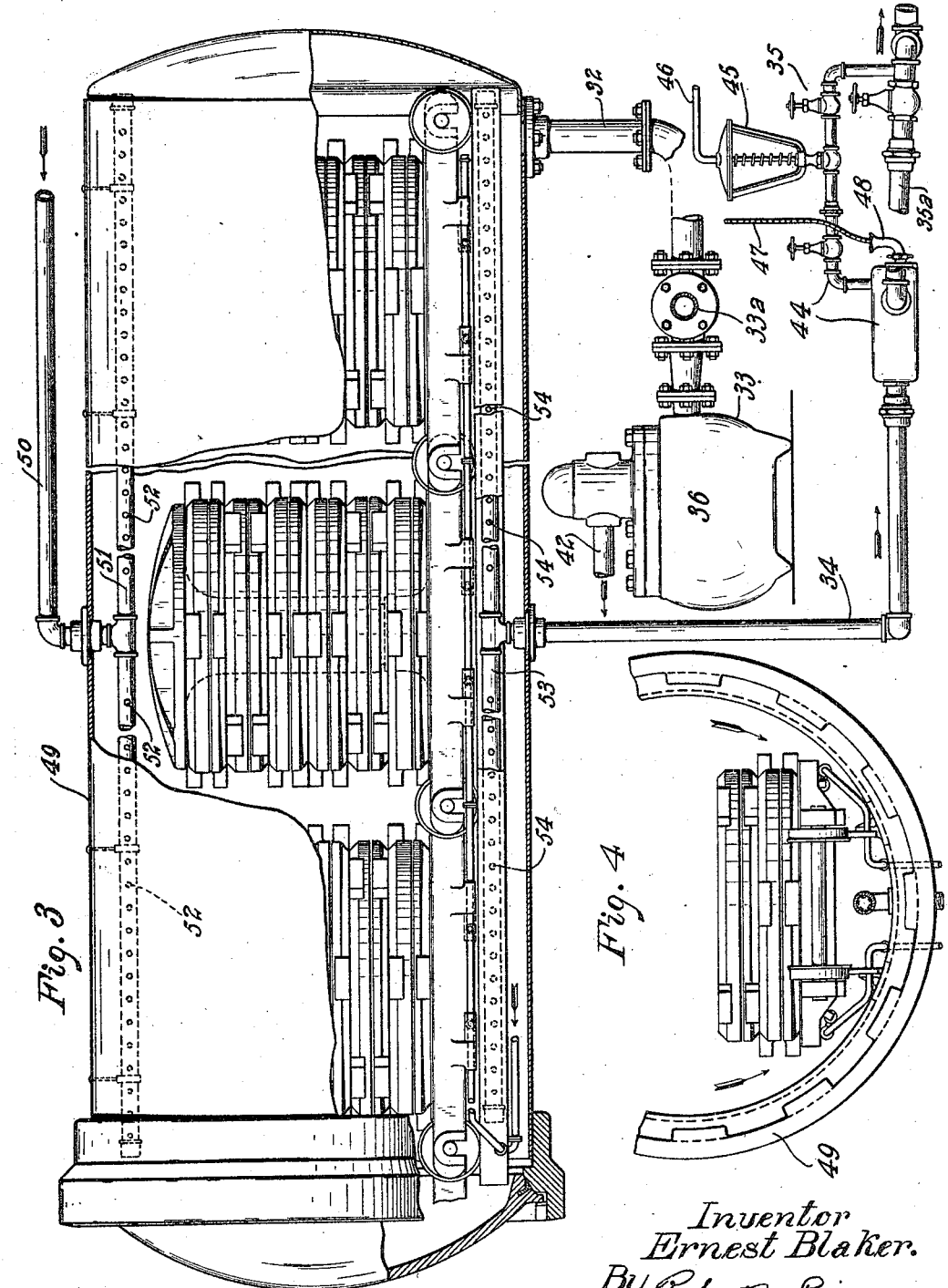

1,604,562

UNITED STATES PATENT OFFICE.

ERNEST BLAKER, OF AKRON, OHIO, ASSIGNOR TO THE B. F. GOODRICH COMPANY, OF NEW YORK, N. Y., A CORPORATION OF NEW YORK.

VULCANIZING APPARATUS AND METHOD.

Application filed May 26, 1922. Serial No. 563,752.

This invention relates to the art of vulcanizing rubber articles and particularly to vulcanizing such articles by injecting a heating fluid into a container enclosing the articles, as in the case of a vulcanizing pot such as is generally used for automobile tires and other rubber goods.

The articles are commonly enclosed in molds, a plurality of which are enclosed in the vulcanizer, the latter at this stage being full of air. Steam is then injected into the vulcanizer, where it mixes with the air contained therein, the pressure of the steam serving to reduce the volume of the air, and thus giving a mixture of air and steam as a heating medium. Such vulcanizers heretofore have been vented to permit the escape of air and water of condensation so as to obtain a larger ratio of steam to air in the heating medium, and consequently a more uniform application of heat to the articles to be vulcanized, but in methods and apparatus heretofore used, so far as I am aware, the venting of the air has been so limited in amount or so slow that, at best, the heating medium during a substantial part of the vulcanizing period has been a mixture containing a large percentage of air. As such a mixture usually is not uniform throughout the interior of the vulcanizer, heat of different degrees is applied to different articles, or different parts of an article, and non-uniform vulcanization results. Steam and air both being comparatively poor conductors of heat, considerable time is required for equalization of temperature throughout the mixture, and meanwhile vulcanization proceeds more rapidly at one point in the vulcanizer than at another. The total vulcanizing period, moreover, is unduly long, not only because of the time necessary to bring the temperature of the entrapped air up to that of the steam, but because the condensing of the steam from the mixture adjacent the relatively cool molds or articles leaves a film of substantially pure air surrounding the latter, and this film acts as an insulator against the passage of heat to the article.

The general objects of my invention are to shorten the time necessary for the vulcanizing operation and to obtain a uniform vulcanization throughout the article or articles. A further object is to provide improved apparatus adapted to apply substantially air-free steam at approximately the same time to all parts of the articles or the molds containing the same, and thus to obviate the difficulties and defects above mentioned.

A further object is to provide a convenient and economical apparatus for the purposes stated, which may be assembled without coupling of pipes and which may be adapted to dispose of the air with a minimum loss of steam through the vent.

Of the accompanying drawings:

Fig. 1 is a vertical section, with parts in elevation and parts broken away, of a vulcanizing apparatus embodying and adapted to carry out my invention.

Fig. 2 is a horizontal section on line 2—2 of Fig. 1.

Fig. 3 is a side elevation of a modification, with parts broken away and in section.

Fig. 4 is a fragmentary end elevation of said modification, with the vulcanizing chamber open.

Referring to the drawings, 10 is a vertical vulcanizer pot or press, preferably circular in section, having the usual ram cylinder 11 and ram 12. 13, 13 are annular tire molds stacked on the head 14 of said ram, one of the tires within said molds being shown at 15 (Fig. 1), and the core within said tire at 16.

The ram head 14 consists of a series of radial webs 17, 17 joining an inner ring 18 with an outer 19, the upper surfaces of said webs and rings lying in the same horizontal plane and being thus adapted to support the stack of molds. The inner ring is formed with apertures through its wall between the webs 17, one of said apertures being shown at 20 (Fig. 1), to permit the passage of heating fluid from the space surrounded by the stack of molds to the region of the vulcanizer outside of the stack of molds.

The lid, 21, of the vulcanizer 10, is formed with lugs 22, 22, on its outer periphery adapted to interlock with lugs 23, 23 on the inner periphery of a collar 23ª at the top of the press, and to be disengaged therefrom, for the removal of the lid, by a partial revolution of the latter. Said lid is centrally formed with a depending cup-like annular flange or ring 24, internally braced by radial webs 25, 25 and externally by radial webs 26, 26, said webs being, as here shown, integral with said rings and with the cover proper, the lower faces of said ring 24 and the last mentioned webs, 26, lying in the same horizontal plane and being thus adapted to abut the upper face of the uppermost mold of the stack, as an upper platen for the press of which the ram-head 14 constitutes the lower platen. The ring 24 is somewhat larger than the central space surrounded by the annular molds so that it bears, with a substantial sealing effect, upon the upper face of the top mold, about said space. Said ring is formed with an aperture 27 through its wall between two adjacent webs 26, to permit the passage of heating fluid from the space outside of the stack of molds to the space inside thereof, as indicated by the arrows in Fig. 1.

For suppling the heating fluid to the vulcanizer I provide an inlet pipe 28 entering the vulcanizer through the vertical wall of the latter near the top and terminating, within the vulcanizer, in a horizontal nozzle 29 having an open end 30 directed tangentially with regard to the space surrounding the molds, and being formed on its upper side with apertures 31, 31 adapted to direct a jet or jets of heating fluid upward between the adjacent webs 26, between which the aperture 27 is positioned in the ring 24, so that said heating fluid will pass through said aperture and into the space surrounded by the stack of molds 13.

For venting the water of condensation from the vulcanizer I provide an outlet pipe 32 leading from the lowest part of the vulcanizing chamber to a trap 33 adapted to permit the out-flow of water but to prevent the passage of fluids such as steam or air, and for venting the air I provide an outlet pipe 34 leading from a substantially higher part of the vulcanizer to a temperature-controled trap 35.

The water-venting trap here shown is of the type commonly called a bucket-trap, comprising a covered vessel or pot 36, into which depends, from its cover, a bracket 37, on which is pivoted a bucket 38, which is of metal or other material heavier than water, so that said bucket will sink when filed with water from the vulcanizer. 39 is a push rod pivotally mounted on the bucket 38 and adapted to close an outlet valve 40 when said bucket rises and to open it when said bucket descends, said rod extending upward to said valve through a nipple 41 depending from the cover into said bucket and communicating, through the valve 40, with a discharging pipe 42. The trap 33 is thus adapted intermittently to discharge water from the bucket 38 through the pipe 42, the valve 40 remaining open, after the bucket fills and sinks, until the fluid pressure from the vulcanizer, through the pipe 32, drives substantially all of the water from said bucket, through the nipple 41, permitting the bucket again to float and close the valve, which latter then remains closed until the bucket again fills with water and sinks. Said trap is thus adapted effectively to dispose of the water of condensation without permitting any considerable quantity of steam or air to escape therewith, as the bucket 38 may be of such size and construction as to float and close the valve before the water-level therein drops below the mouth of the nipple 41.

The temperature-controlled, air-venting trap 35, as here shown, is of a type heretofore known in other types of apparatus, and comprises a valve 43 in a discharge conduit 44 leading from the pipe 34, a diaphragm top 45 for said valve adapted to be actuated by an air line 46 leading from an air pressure controller (not shown) and a liquid-filled tube 47 leading from a thermometric bulb member 48, mounted in the conduit 44, to said air pressure controller, for varying the pressure in the air line 46 in accordance with pressure changes in the tube 47 induced by temperature changes in the conduit 44. The trap 35 is thus adapted to permit the discharge of air and steam from the vulcanizer so long as their temperature does not exceed a certain degree determined by the setting of the trap, but to close against their passage when such degree of temperature is reached.

The temperature-controlled, air-venting trap is provided with a normally-closed by-pass 35ª, and the water-venting trap 33 is provided with a normally-closed by-pass 33ª, so that the respective traps may be cut out of the discharge lines on occasion, as in the case of making repairs or adjustments of the traps without discontinuing the use of he vulcanizer. Said by-passes may also be opened more or less, especially during the early stage of venting the vulcanizer, to supplement the venting action of the traps and thus more rapidly to dispose of the air and water.

In the operation of the apparatus shown in Figs. 1 and 2, the tire-containing molds 13 being mounted in the vulcanizer, as shown, and the latter closed, steam is admitted thereto through the inlet pipe 28, part of said steam being jetted tangentially into the upper part of the vulcanizer through the open end 30 of the nozzle 29, and part of it being directed upward through the apertures 31 of said nozzle into the vulcanizer cover 21 and from there into the space surrounded by the molds.

The application of steam to the inner and outer peripheries of the annular molds is thus practically simultaneous, and is accomplished without the necessity of making any pipe connection such as heretofore has been necessary in injecting steam through the vulcanizer cover into the chamber formed by the stack of molds. I do not wholly limit my claims, however, to the jetting of the steam into the cover as distinguished from conducting it thereinto.

The ring 24 and the aperture 27 of the cover being of relatively large steam-conducting capacity, the velocity of the current of steam is reduced before it enters said chamber, so that it does not mix with an undue amount of the air therein, as would occur if it were jetted directly thereinto, but on the contrary moves gradually downward, pushing the air before it, with a minimum mixing of the two.

The part of the steam which enters the space between the stack of molds and the vulcanizer wall, being directed tangentially, sets up a rapid circulation of steam around the stack of molds, so that the parts of the molds at the other side of the vulcanizer from the nozzle 29 are heated substantially as fast as the parts adjacent said nozzle, and there is no local over-heating of the molds such as might occur if the jet of incoming steam impinged directly upon the molds. As the horizontally whirling body of steam moves downward it pushes the air before it with less general mixing of the two than would occur if the steam were jetted downward instead of in the horizontal, tangential direction, and the current of steam about the molds disperses such film of air as may form next to the molds by reason of the condensation of steam from the mixture adjacent thereto.

In order that the action of the two branches of the incoming current of steam, as described, may continue downward past the entire stack of molds, it is important that the water of condensation and air be freely and rapidly vented from the lower part of the vulcanizing chamber, and I find that this is accomplished, rapidly and with a very small loss of steam, by the use of the separate traps for air and water respectively, the air vent being positioned substantially above the water vent, so that its action is not hampered by the presence of water. Since the temperature of the water may vary considerably from that of the air, the steam, or a mixture of the two, the passage of any substantial quantity of water through the temperature controlled trap would render the temperature control of the latter sluggish and inaccurate, whereas, with only air or steam passing through said trap, its temperature control is more accurately responsive to the effective temperature existing in the region of the molds. Moreover, the air may be substantially all discharged, before it has time to mix generally with the steam, since the air does not have to await the discharge of the water as is the case where both are vented through the same outlet.

By a proper proportioning of the respective apertures of the nozzle 29 and the apertures 20 of the ram head, the respective currents of steam passing through the vulcanizer inside and outside of the stack of molds can be so proportioned that the air will be exhausted from the interior and exterior of the mold stack in substantially the same length of time, so that substantially uniform vulcanization of the tires is effected. The air being quickly vented, it does not require to be heated by the incoming steam.

When the fluid within the vulcanizer has reached the desired temperature, predetermined by the setting of the trap 35, which it does very promptly, said trap automatically closes the valve 43, and the vulcanizing temperature thus is accurately determined from substantially the beginning of the operation. Moreover, the heating fluid consisting entirely, or almost entirely, of steam, the temperature throughout the vulcanizing period can be more accurately controlled by steam pressure than is the case where a mixture comprising a large but uncertain proportion of air is used, since the temperature of such a mixture can not be so accurately ascertained from the steam pressure as can that of pure saturated steam.

While I have described the venting of the air and water through the traps only, I do not wholly limit my invention to such mode of procedure. The quick action of the traps may be supplemented by opening the by-pass 35ª or 33ª, or both, at the beginning of the vulcanizing operation, and then closing them before the by-pass 33ª discharges any substantial quantity of air or steam, or before the by-pass 35ª discharges any substantial quantity of steam or air at a temperature above that at which the trap 35 is set to close.

In the modification shown in Figs. 3 and 4, certain features of the invention are adapted for use with a horizontal vulcanizer 49, which is provided at its top with a steam supply pipe 50. Said supply pipe enters the elongated vulcanizer near the middle thereof and communicates with a long pipe 51 supported horizontally in the upper part of the vulcanizing chamber and extending substantially to the ends thereof. The pipe 51 is closed at its ends and is formed, throughout its length, with numerous small, spaced perforations 52, 52 in its walls, so that steam will be introduced at substantially the same time and at the same low velocity throughout the upper region of the vulcanizing chamber. A water venting trap 33, the parts of which are designated by the same numerals as in Fig. 1, is provided, the pipe 32 connecting it with the bottom of the vulcanizing chamber. A temperature controlled air-venting trap 35, corresponding to that shown in Fig. 1 is also provided, and the pipe 34 which connects it with the vulcanizing chamber communicates, inside the chamber, with a long, horizontal pipe 53 extending the length of the vulcanizer and positioned substantially above the floor of the latter, so as to vent the air separately from the water, the pipe 53 being closed at its ends and formed throughout its length with numerous small perforations 54, 54. Said several perforations being approximately of the same size and equally spaced, they are adapted to permit the air to escape uniformly from all points along the lower region of the vulcanizing chamber.

In this modification, as in the apparatus shown in Figs. 1 and 2, the steam enters the vulcanizing chamber at the top while the air and water are separately vented at the bottom, the air thus being promptly disposed of without becoming generally mixed with the steam. A heating medium of substantially uniform temperature is thereby quickly obtained, the air vent is automatically closed when the desired temperature is reached and the temperature within the chamber thereafter conforms closely to the theoretical temperature corresponding to the steam pressure used. In both of the embodiments here shown advantage is taken of the fact that, at a given temperature and pressure, air is heavier than steam, the difference in their weight being utilized to avoid excessive mixing of the two. I do not wholly limit my invention, however, to injecting the steam at the top of the vulcanizer and venting the air at the bottom, although this is a substantial advantage, nor do I otherwise desire to limit it except as required by the prior art or as defined in the appended claims.

I claim:

1. Vulcanizing apparatus comprising a container for the article to be vulcanized, means for supporting the article therein substantially above the bottom thereof, steam-conducting means opening into the article-surrounding space of said container at the top of the latter, and means for venting air from said container, said air-venting means leading off from a point substantially above the bottom of said container, but below the article supported therein.

2. Vulcanizing apparatus comprising a container for the article to be vulcanized, steam-conducting means opening into said container at the top of the latter, and a temperature controlled air-venting trap leading off from said container at a point near but substantially above the lowermost part thereof.

3. Vulcanizing apparatus comprising a container for the article to be vulcanized, means for supporting the article therein substantially above the bottom thereof, steam-conducting means opening into said container approximately at the top of the latter, means for venting air from said container, said air-venting means leading off from a point substantially above the bottom of said container, but below the article supported therein, and means responsive to fluid conditions obtaining in said container for automatically closing said air-venting means.

4. Vulcanizing apparatus comprising a container for the article to be vulcanized, steam-conducting means opening into said container at one terminal portion thereof, and a temperature-controlled, air-venting trap leading off from the other terminal portion at a point near but substantially above the lowest part of said container.

5. Vulcanizing apparatus comprising a container for the article to be vulcanized, means for conducting a current of steam into the upper part of said container, means for reducing the velocity of said current without substantial admixture of air thereto before it approaches the central region of said container, and air-venting means leading off from the lower part of said container.

6. Vulcanizing apparatus comprising a container for the article to be vulcanized, fluid-conducting inlet opening into said container near the top thereof, a water-venting trap leading off from the lower part of said container and a temperature controlled air-venting trap leading off from said container at a point substantially above that from which said water-venting trap leads.

7. Vulcanizing apparatus comprising a container for the article to be vulcanized, fluid-conducting means opening into said container, a water-venting trap leading off from the lower part of said container, a temperature controlled air-venting trap leading off from said container at a point substantially above that from which said water-venting trap leads, and additional means for venting fluid from said container without causing it to pass through either of said traps.

8. Vulcanizing apparatus comprising a container for the article to be vulcanized, said container being substantially of circular section, steam-conducting means opening into one end portion thereof and adapted to direct a current of steam tangentially thereinto, and air-venting means leading off from the opposite end portion of said container.

9. Vulcanizing apparatus comprising a container for the article to be vulcanized, means for injecting steam tangentially into the upper part thereof, and means for venting air from the lower part thereof.

10. Vulcanizing apparatus comprising a container for the article to be vulcanized, means for injecting steam tangentially into the upper part thereof, means for venting water of condensation from the lower part thereof, and separate air-venting means leading off from a point near but substantially above the outlet to said water-venting means.

11. Vulcanizing apparatus comprising a container for the article to be vulcanized, means for injecting steam tangentially into the upper part thereof and a temperature-controlled air-venting trap leading off from a point near but substantially above the bottom thereof.

12. Vulcanizing apparatus for annular articles, said apparatus comprising a container for the articles to be vulcanized, fluid-venting means leading off from the lower part thereof, a vertical ram therein, a set of annular molds adapted to be stacked on said ram and thereby to form a chamber, said molds or said ram being so formed as to provide an outlet from the lower part of said chamber, a lid for said container adapted to serve also as a perforate lid for said chamber and as an upper platen for said ram, said cover being formed with a channel adapted to connect said chamber with the outer space, about said molds, in said container, a fluid conduit leading into said outer space, and means for directing a current of fluid from said conduit into the channel of said cover.

13. Vulcanizing apparatus for annular articles, said apparatus comprising a container for the articles to be vulcanized, fluid-venting means leading off from the lower part thereof, a vertical ram therein, a set of annular molds adapted to be stacked on said ram and thereby to form a chamber, said molds or said ram being so formed as to provide an outlet from the lower part of said chamber, a lid for said container adapted to serve also as a perforate lid for said chamber and as an upper platen for said ram, said cover being formed with a channel adapted to connect said chamber with the outer space, about said molds, in said container, and a fluid conduit opening into the upper part of said space.

14. Vulcanizing apparatus for annular articles, said apparatus comprising a container for the articles to be vulcanized, a vertical ram therein, a set of annular molds adapted to be stacked on said ram and thereby to form a chamber, said molds or said ram being so formed as to provide an outlet from the lower part of said chamber, a lid for said container adapted to serve also as a perforate lid for said chamber and as an upper platen for said ram, said cover being formed with a channel adapted to connect said chamber with the outer space, about said molds, in said container, a fluid conduit leading into said outer space, means for directing a current of fluid from said conduit into the channel of said cover, and air-venting means leading off from the lower part of said container at a point substantially above the lowest part thereof.

15. Vulcanizing apparatus for annular articles, said apparatus comprising a container for the articles to be vulcanized, a vertical ram therein, a set of annular molds adapted to be stacked on said ram and thereby to form a chamber, said molds or said ram being so formed as to provide an outlet from the lower part of said chamber, a lid for said container adapted to serve also as a perforate lid for said chamber and as an upper platen for said ram, said cover being formed with a channel adapted to connect said chamber with the outer space, about said molds, in said container, a fluid conduit leading into said outer space, means for directing a current of fluid from said conduit into the channel of said cover, and a temperature-controlled, air-venting trap leading off from the lower part of said container but at a point substantially above the lowest part thereof.

16. Vulcanizing apparatus for annular articles, said apparatus comprising a container for the articles to be vulcanized, fluid-venting means leading off from the lower part thereof, a vertical ram therein, a set of annular molds adapted to be stacked on said ram and thereby to form a chamber, said molds or said ram being so formed as to provide an outlet from the lower part of said chamber, a lid for said container adapted to serve also as a perforate lid for said chamber and as an upper platen for said ram, said cover being formed with a channel adapted to connect said chamber with the outer space, about said molds, in said container, a fluid conduit leading into said outer space, and means for directing a part of a current of fluid from said conduit into the channel of said cover while permitting the rest of said current to flow into said outer space.

17. Vulcanizing apparatus for annular articles, said apparatus comprising a container for the articles to be vulcanized, fluid-venting means leading off from the lower part thereof, a vertical ram therein, a set of annular molds adapted to be stacked on said ram and thereby to form a chamber, said molds or said ram being so formed as to provide an outlet from the lower part of said chamber, a lid for said container adapted to serve also as a perforate lid for said chamber and as an upper platen for said ram, said cover being formed with a channel adapted to connect said chamber with the outer space, about said molds, in said container, a fluid conduit leading into said outer space, and means for directing a part of a current of fluid from said conduit into the channel of said cover and another part of said current tangentially into said space.

18. Vulcanizing apparatus for annular articles, said apparatus comprising a container for the articles to be vulcanized, a ram therein, a set of annular molds for said articles, said molds being adapted to be stacked upon said ram to form an inner chamber within said container and said molds or said ram being so formed as to provide an outlet from the lower part of said chamber, a cover for said container adapted to serve also as a perforate lid for said chamber, and as an upper platen for said ram, said cover being formed with a channel connecting said chamber with the outer space, about said molds, in said container steam-conducting means leading into said space, means for directing a part of a current of steam therefrom into the channel of said container and another part thereof tangentially in said space, a water-venting trap leading off from the lower part of said container, and a temperature-controlled air-venting trap leading off from the lower part of said container at a point above that from which said water-venting trap leads.

19. The method of vulcanizing annular articles which comprises assembing in a container said articles substantially in axial alignment to form an interior and an exterior heating chamber, admitting steam into adjacent ends of each of said chambers in such manner as gradually to crowd the air toward the other ends of the chambers, and venting the displaced air from the said other ends of the chambers.

20. The method of vulcanizing annular articles which comprises enclosing the articles in annular molds, assembling said molds in a container substantially in axial alignment to form an interior and an exterior heating chamber, conducting steam into adjacent ends of each of said chambers in such manner as gradually to crowd the air toward the other ends of the chambers, and venting the displaced air from the said other ends of the chambers.

21. The method of vulcanizing annular articles which comprises assembling said articles in a substantially axially aligned series in an atmosphere of air, and displacing said air by so circulating a current of steam circumferentially with respect to said series of articles as gradually to crowd the air from one end of said series toward the other end thereof.

22. The method of vulcanizing articles which comprises enclosing said articles in molds, assembling said molds in an aligned series in an atmosphere of air, and displacing said air by so circulating a current of steam transversely around said series of molds as gradually to crowd the air from one end of said series of molds toward the other end thereof.

23. The method of vulcanizing an article which comprises enclosing said article in an atmosphere of air and displacing said atmosphere with steam from above while so venting the air as to permit its escape independently of and without substantial admixture with accumulated water of condensation.

24. The method of vulcanizing an article which comprises enclosing said article in an atmosphere of air and displacing said atmosphere with steam from above while separately venting said air and the water of condensation from said steam.

25. The method of vulcanizing an article which comprises enclosing said article in a chamber, and displacing the air from said chamber by so circulating a current of steam circumferentially within said chamber as gradually to crowd the air from one end to the other of said chamber.

In witness whereof I have hereunto set my hand this 24 day of May, 1922.

ERNEST BLAKER.